United States Patent [19]
Yanagisawa et al.

[11] Patent Number: 5,952,455
[45] Date of Patent: Sep. 14, 1999

[54] PROCESS FOR PRODUCING POLYHYDROXYCARBOXYLIC ACID

[75] Inventors: Norio Yanagisawa; Toshikazu Murayama, both of Yokkaichi; Yorozu Yokomori, Ichihara; Yoshiharu Kimura, Ohmihachiman; Nobuko Tsuzaki, Yokkaichi, all of Japan

[73] Assignee: Kyowa Hakko Kogyo Co., Ltd., Tokyo, Japan

[21] Appl. No.: 08/948,300

[22] Filed: Oct. 10, 1997

Related U.S. Application Data

[62] Continuation-in-part of application No. 08/836,429, Sep. 24, 1997, abandoned, and a continuation-in-part of application No. 08/847,736, Apr. 22, 1997, abandoned, which is a continuation-in-part of application No. 08/727,424, Oct. 11, 1996, abandoned, said application No. 08/836,429, filed as application No. PCT/JP96/02326, Aug. 20, 1996, abandoned.

[51] Int. Cl.⁶ .................................................. C08G 63/56
[52] U.S. Cl. ........................... 528/361; 528/354; 528/357
[58] Field of Search .................................... 528/361, 354, 528/357

[56] References Cited

U.S. PATENT DOCUMENTS

| 4,767,628 | 8/1988 | Hutchinson . |
| 5,302,693 | 4/1994 | Stricker et al. . |
| 5,310,865 | 5/1994 | Enomoto et al. ........................ 528/361 |
| 5,440,008 | 8/1995 | Ichikawa et al. ........................ 528/361 |

FOREIGN PATENT DOCUMENTS

| WO95/28432 | 3/1995 | Japan . |

OTHER PUBLICATIONS

Polymer Preprints, Japan, vol. 44, No. 12 (1995), pp. 3140–3147.
Allowed claims of the Application Serial No. 08/849,389.

*Primary Examiner*—Duc Truong
*Attorney, Agent, or Firm*—Antonelli, Terry, Stout & Kraus, LLP

[57] ABSTRACT

The present invention provides a process for producing polyhydroxycarboxylic acids which have a weight-average molecular weight of 50,000 or above and which are excellent as biodegradable plastics by polycondensing hydroxycarboxylic acids or oligomers thereof in the presence of an inorganic solid acid catalyst in combination with an alkali metal or an alkaline earth metal.

22 Claims, No Drawings

PROCESS FOR PRODUCING POLYHYDROXYCARBOXYLIC ACID

Ser. No. 08/948,300 filed Oct. 10, 1997 is a continuation-in-part application of Ser. No. 08/836,429 filed Sep. 24, 1997, now abandoned which is a national stage application of PCT/JP96/02326 filed Aug. 20, 1996. Ser. No. 08/948,300 filed Oct. 10, 1997 is also a continuation-in-part application of Ser. No. 08/847,736 filed Apr. 22, 1997 (now abandoned); which is a continuation-in-part of Ser. No. 08/727,424 filed Oct. 11, 1996 (now abandoned).

TECHNICAL FIELD

The present invention relates to a process for producing polyhydroxycarboxylic acids, specifically, those having a weight-average molecular weight of 50,000 or above. Said polyhydroxycarboxylic acids are useful as biodegradable plastics for food-wrapping films, beverage bottles, drug delivery systems, etc.

BACKGROUND ART

The following two methods are known as methods for producing polyhydroxycarboxylic acids by polymerizing hydroxycarboxylic acids such as lactic acid and glycolic acid: one is ring-opening polymerization of cyclic dimers of hydroxycarboxylic acids such as lactide and glycolide, and the other of direct dehydration condensation of hydroxycarboxylic acids.

As an example of the process which involves ring-opening polymerization of cyclic dimers of hydroxycarboxylic acids, Japanese Published Examined Patent Application No. 14688/81 discloses a process for producing copolymers of lactic acid and glycolic acid having an average molecular weight of 72,000 by copolymerizing, in the presence of stannous octanoate, a mixture of lactide and glycolide respectively obtained by dehydration polycondensation of lactic acid and glycolic acid. Japanese Published Unexamined Patent Application No. 69553/90 discloses polylactic acids and polyglycolic acids having molecular weights of 10,000–800,000, and also discloses, as an example of polylactic acid synthesis, a process for producing polylactic acids of molecular weights of 100,000 by subjecting DL-lactide to ring-opening polymerization in the presence of stannous octanoate catalyst.

Polyhydroxycarboxylic acids of high molecular weights can be obtained by these processes that involve ring-opening polymerization of cyclic dimers of hydroxycarboxylic acids. However, such processes have various problems for industrial utilization; that is, they are complicated with many steps, the yield of polymers produced is low, and the cost rises as a result.

On the other hand, processes by direct dehydration polycondensation of hydroxycarboxylic acids are industrially advantageous with fewer steps, high yield and low cost. However, these processes are not applicable to the production of polyhydroxycarboxylic acids of high molecular weights. As an example of the improved process of this direct dehydration condensation, Japanese Published Unexamined Patent Application No. 28521/86 discloses a process for producing polymers or copolymers of lactic acid and glycolic acid having a weight-average molecular weight of more than 5, 000, usually 5,000–30,000, by subjecting lactic acid and/or glycolic acid to polycondensation reaction in the presence or absence of an inorganic solid acid catalyst such as acid clay, activated clay, bentonite, kaolin, talc, aluminum silicate, magnesium silicate, aluminum borate, or silicic acid.

The weight-average molecular weight of the polymers or the copolymers produced by said process is around 30,000 at most. Even polymers or copolymers of weight-average molecular weight at such level may be considered to be satisfactory in physical properties as polymers to be used in bioabsorbable pharmaceutical compositions which are objective of said process, but they are dissatisfactory in physical properties as biodegradable plastics. Japanese Published Examined Patent Application No. 52930/90 discloses a process for producing polylactide having a molecular weight of at least 4,000, usually 4,000–20,000 by subjecting lactic acid to polycondensation reaction in the absence of a catalyst at a temperature of 220–260° C. and at a pressure of less than 10 mmHg. Japanese Published Examined Patent Application No. 13963/93 discloses a process for producing polyglycolide or polylactide having a molecular weight of 8,000–11,000 by adding a phosphoric acid compound or a phosphorous acid compound when the molecular weight of lactic acid or glycolic acid subjected to polycondensation reaches 2,000–6,000 in the presence of a tin compound.

Japanese Published Unexamined Patent Application No. 65360/94 discloses a process for producing of polyhydroxycarboxylic acids having a weight-average molecular weight of more than 15,000, usually 5,000–200,000, by subjecting hydroxycarboxylic acids or oligomers thereof to dehydration polycondensation reaction in a reaction mixture containing an organic solvent substantially in the absence of water.

In this process, a catalyst is not necessarily used, but the use of a catalyst can accelerate the reaction. Metals belonging to II, III, IV, and V groups of the periodic table, and oxides or salts thereof are mentioned as catalysts. The use of an organic solvent in the reaction necessitates an additional complicated step to distil the organic solvent in this process.

Polymer Preprints, Japan, Vol. 44, No. 12, p. 3146–3147 (issued on Sep. 1, 1995) discloses a method for olycondensation of 90% L-lactic acid by the use of repolymers (weight-average molecular weight: 10,000–50,000) synthesized in the presence of stannous chloride. In this method, the molecular weight of polymers produced can be increased by introducing lactide into the reaction system, and the polycondensation reaction can be accelerated by using a solvent such as diphenyl ether to efficiently remove the water formed.

WO 95/28432 discloses a method for producing polyhydroxycarboxylic acids having a weight-average molecular weight of 50,000 or above by subjecting hydroxycarboxylic acids or oligomers thereof to polycondensation in the presence of aluminum silicate containing aluminum oxide in an amount of 5–40 wt %. This method does not use an organic solvent, but it takes a lot of time to produce polyhydroxycarboxylic acids of high molecular weight.

As described above, none of the prior art teaches a method for producing polyhydroxycarboxylic acids having a weight-average molecular weight of 50,000 or above in high yield in a short time by direct dehydration polycondensation of hydroxycarboxylic acids or oligomers thereof.

DISCLOSURE OF THE INVENTION

The present invention provides a process for producing polyhydroxycarboxylic acids, specifically, polyhydroxycarboxylic acids having a weight-average molecular weight of 50,000 or above by subjecting hydroxycarboxylic acids or oligomers thereof to polycondensation in the presence of an inorganic solid acid catalyst in combination with an alkali metal compound catalyst or an alkaline earth metal compound catalyst.

Further, the present invention provides a process for producing polyhydroxycarboxylic acids, specifically, polyhydroxycarboxylic acids having a weight-average molecular weight of 50,000 or above by subjecting hydroxycarboxylic acids or oligomers thereof to polycondensation in the presence of an inorganic solid acid catalyst in combination with an alkali metal compound catalyst or an alkaline earth metal compound catalyst and a Lactide.

The polyhydroxycarboxylic acids of the present invention include polymers of hydroxycarboxylic acids, and copolymers of hydroxycarboxylic acids.

The hydroxycarboxylic acids suitable for use in the present invention are aliphatic hydroxycarboxylic acids having 2–6 carbon atoms such as lactic acid, glycolic acid, hydroxybutyric acid, hydroxyvaleric acid, and hydroxycaproic acid, which maybe in any of the D-, L-, and DL-forms. Usually, commercially available hydroxycarboxylic acids are used.

The hydroxycarboxylic acids may be used in combination with cyclic dimers thereof.

As the oligomers of hydroxycarboxylic acids, oligomers having a molecular weight of 300–3,000 are used, which can be usually produced by subjecting hydroxycarboxylic acids to dehydration polycondensation.

The polymers of hydroxycarboxylic acids are prepared by using a single kind of hydroxycarboxylic acid. The copolymers of hydroxycarboxylic acids are prepared from a mixture of 2 or more kinds of hydroxycarboxylic acids, or a mixture of at least one kind of hydroxycarboxylic acid and at least one kind of cyclic compound derived from hydroxycarboxylic acid, i.e. a mixture of at least one kind of hydroxycarboxylic acid such as glycolic acid or lactic acid and at least one kind of cyclic compound derived from hydroxycarboxylic acid such as γ-butyrolactone or ε-caprolactone.

The hydroxycarboxylic acids may be used in the form of a solid, an aqueous solution, etc. Usually, commercially available 50–90% aqueous solutions are used.

The Lactides suitable for use in the present invention include, for example, lactide and glycolide. As the Lactides, besides commercially available ones, substances mainly comprising Lactides which are formed as by-products in the reaction system for the production of polyhydroxycarboxylic acids may be used. The by-products whose main component is Lactides contain Lactides in an amount of at least 50 wt %, and may also contain straight-chain dimers or straight-chain trimers of hydroxycarboxylic acids.

The Lactide may be introduced into the polycondensation process at any of the following stages.

1) The Lactide is added to an aqueous solution of hydroxycarboxylic acid used as a starting material.
2) The Lactide is added when the molecular weight of oligomer becomes 200–3,000.
3) The Lactide is added when the molecular weight becomes as high as 3,000 or above.

1) Addition of the Lactide to an aqueous solution of hydroxycarboxylic acid as a starting material:

The by-product whose main component is Lactide which is formed by polycondensation can be recycled by adding it to an aqueous solution of hydroxycarboxylic acid used as a starting material, and as a result, the yield from the hydroxycarboxylic acid can be enhanced.

2) Addition of the Lactide at a time when the molecular weight of oligomer becomes 200–3,000:

The yield from the hydroxycarboxylic acid as a starting material can be enhanced as well as in the case of 1) above by adding the Lactide at the time when the molecular weight of oligomer becomes 200–3,000. At this stage in the polycondensation process, a large amount of water contained in the hydroxycarboxylic acid has been almost removed, and hence the molecular weight can be increased more efficiently.

3) Addition of the Lactide at the time when the molecular weight becomes as high as 3,000 or above:

The Lactide added acts as an reactant and shows the effect of enhancing the yield, and the Lactide of low molecular weight acts also as a solvent, thereby lowering the viscosity of the reaction mixture. Further, the Lactide has the effect of enhancing the efficiency of water removal from the reaction system by azeotropic dehydration. In order to maximize the effects of the Lactide at this stage, it is efficient to carry out the reaction under the reflux conditions for the Lactide using a partial condenser. As a result, stirring can be accomplished with lower power, and the efficient dehydration becomes possible under only slightly reduced pressure. Under the same reaction conditions, the molecular weight becomes higher in less time.

The Lactide can be introduced into the polycondensation process by one of the following methods: a method wherein the above commercially available Lactide or the Lactide formed as a by-product in the reaction system and recovered is added to the reaction system; and a method wherein the Lactide formed as a by-product in the reaction system is stored and circulated in the system.

As the inorganic solid acid catalysts, catalysts which are mainly composed of silica or alumina, such as aluminum silicate, silica gel, zeolite, aluminum oxide, magnesium silicate, activated clay, acid clay, aluminum borate, bentonite, kaolin, talc, and silicate are used. Usually, commercially available ones are used.

The inorganic solid acid catalyst can be added as it is or as a dispersion in a solvent such as toluene or xylene, at the start of reaction together with starting materials or in the course of reaction.

The inorganic solid acid catalyst is used in an amount of 0.03–10 wt %, preferably 0.5–7 wt %, more preferably 1–5 wt % based on the amount of a hydroxycarboxylic acid or an oligomer thereof, in one to several portions.

As the alkali metal compound catalysts or the alkaline earth metal compound catalysts, inorganic acid addition salts such as carbonate and bicarbonate, organic acid addition salts such as hydroxycarboxylate (e.g. lactate and glycolate) and acetate, oxides, hydroxides, etc. of alkali metals such as lithium, sodium, and potassium, or alkaline earth metals such as magnesium and calcium are used.

The alkali metal compound catalyst or the alkaline earth metal compound catalyst is added to a reaction mixture in such an amount that the concentration of the alkali metal or the alkaline earth metal eluted in the solution mixture becomes 10–10,000 ppm, preferably 100–3,000 ppm.

As the catalysts to be used in the process of the present invention, the following catalyst (1), (2)and (3),in which an inorganic solid acid catalyst in combined with an alkali metal compound catalyst or an alkaline earth metal compound catalyst, are mentioned.

(1) An inorganic solid acid catalyst is treated with an aqueous solution of an alkali metal compound catalyst or an alkaline earth metal compound catalyst such as carbonate, bicarbonate or hydroxide to obtain an inorganic solid acid catalyst carrying an alkali metal compound catalyst or an alkaline earth metal compound catalyst. The metal elution test is carried out in the same manner as in Example 1 to select those in which metal elution is observed, out of the thus obtained inorganic solid acid catalyst carrying an alkali metal compound catalyst or an alkaline earth metal compound catalyst.

(2) Using an inorganic solid acid catalyst which already carries as a component an alkali metal compound catalyst or an alkaline earth metal compound catalyst, the metal elution test is carried out in the same manner as in Example 1. The inorganic solid acid catalyst having metal elution does not need the treatment mentioned in (1) and can be used as it is. An example of such catalysts is zeolite.

(3) An inorganic solid acid catalyst is added to a raw material solution together with an alkali metal compound catalyst or an alkaline earth metal compound catalyst such as carbonate, bicarbonate, hydroxycarboxylate, acetate, hydroxide, or oxide. Alternatively, an alkali metal compound catalyst or an alkaline earth metal compound catalyst such as carbonate, bicarbonate, hydroxycarboxylate, acetate, hydroxide, or oxide is added to a reaction mixture to which an inorganic solid acid catalyst is added.

The polycondensation reaction is usually carried out at 120–150° C. for 5–10 hours at atmospheric pressure in a stream of nitrogen to prepare oligomers. The polycondensation reaction after the preparation of oligomers is carried out at 160–250° C., preferably 180–240° C., more preferably 180–220° C., at 0.05–40 mmHg, preferably 0.1–25 mmHg, for 5–50 hours, preferably 10–30 hours.

In this step, in the case of the polycondensation reaction in the presence of a Lactide, the amount of the remaining Lactide is reduced to a level of 0.5 wt % or below based on the amount of polyhydroxycarboxylic acid.

The polycondensation reaction of the present invention may be carried out by either continuous operation or batch operation. As the viscosity of the reaction mixture becomes high in the latter stage of the polycondensation reaction, the use of a reactor with good stirring efficiency such as a horizontal biaxial processor is preferable.

After the reaction is completed, the reaction product obtained in the molten state is cooled to room temperature to give solidified polyhydroxycarboxylic acid.

The weight-average molecular weight of the polyhydroxycarboxylic acids obtained by the process of the present invention is usually 50,000–300,000, though it varies with the kind and amount of catalysts, reaction temperature, reaction pressure, reaction time, etc.

The obtained polyhydroxycarboxylic acids usually carry 0.03–10 wt % of an inorganic solid acid catalyst and are biodegradable.

For the use in drug delivery systems, polyhydroxycarboxylic acids carrying substantially no inorganic solid acid catalyst are preferable. The polyhydroxycarboxylic acids carrying substantially no inorganic solid acid catalyst (inorganic solid acid catalyst content: less than 0.03 wt %) are obtained by purifying the polyhydroxycarboxylic acids carrying 0.03–10 wt % of an inorganic solid acid catalyst.

Purification can be carried out in the following manner.

A polyhydroxycarboxylic acid carrying an inorganic solid acid catalyst is dissolved in a halogenated hydrocarbon such as chloroform, and the insoluble inorganic solid acid catalyst is removed by filtration. The filtrate is added to a lower alcohol such as isopropanol, and the polyhydroxycarboxylic acid precipitated is separated.

For the use as biodegradable polymers, the polyhydroxycarboxylic acids carrying an inorganic solid acid catalyst or the polyhydroxycarboxylic acids obtained by adding an inorganic solid acid catalyst as a degradation promoter are usually preferable, though the polyhydroxycarboxylic acids carrying substantially no inorganic solid acid catalyst can also be used as biodegradable polymers.

BEST MODE FOR CARRYING OUT THE INVENTION

Examples are shown below.

(*1) Measurement of the Weight-Average Molecular Weight of Lactic Acid Polymer

A lactic acid polymer was dissolved in chloroform to prepare a 0.2% solution, and the weight-average molecular weight was measured by gel permeation chromatography (GPC) using standard polystyrene of known molecular weight. As GPC columns, TOSOH G-5000, TOSOH G-3000, and TOSOH G-1000 (TOSOH CORPORATION) connected in series were used, and the measurement was carried out at a temperature of 40° C.

(*2) Measurement of the Tensile Strength and the Elongation Percentage of Lactic Acid Polymer A lactic acid polymer was dissolved in chloroform to prepare a film (thickness: 50–100 $\mu$) by the casting method. This film was used to prepare No. 2 test pieces in accordance with JISK7127, and the tensile strength and the elongation percentage were measured at a tensile speed of 1 mm/min. (Hereinafter the measurement is carried out in the same manner)

EXAMPLE 1

A 90 wt % aqueous solution of L-lactic acid (500 g) was put into a reaction vessel equipped with a stirrer, a Dean-Stark trap, and a nitrogen-introducing tube. After substitution of nitrogen gas was carried out three times, the solution was concentrated at 150° C. for 6 hours with stirring in a stream of nitrogen, simultaneously with the removal of the distilled water, to give 365 g of lactic acid oligomer. The molecular weight of this lactic acid oligomer was 235.

The molecular weight was calculated after the lactic acid oligomer was dissolved in acetone and the resulting solution was titrated with 0.1 N KOH ethanol using BTB (Bromothymol Blue) indicator.

To 100 g of the obtained lactic acid oligomer was added 2.1 g of Baylith 5A*[3] (synthetic zeolite: Kurita Water Industries Ltd.) with which sodium elution (381 ppm) had been observed by the treatment described below. Then, the temperature was raised to 220° C., and the pressure was reduced gradually to 20 mmHg over 30 minutes. The mixture was stirred at 210±10° C. for 3 hours. After the pressure was reduced gradually to 1 mmHg over 30 minutes, the mixture was stirred at 210±10° C. for 7 hours to give lactic acid polymer in the molten state. The product was cooled to room temperature to give 60.30 g of lactic acid polymer as a light brown solid. The weight-average molecular weight of this polymer was 61,000.

*3 To 100 g of lactic acid oligomerwas added 2 g of Baylith 5A (synthetic zeolite), and the mixture was stirred at 80° C. for 24 hours in an atmosphere of nitrogen.

After addition of chloroform with stirring, the resulting mixture was filtered with a filter paper, followed by filtration using a membrane filter (0.1 $\mu$). After the filtrate was confirmed to be transparent with the naked eye, the amount of alkali metal and alkaline earth metal eluted into the filtrate (lactic acid oligomer) was determined by ICP (inductively coupled plasma) [device: UOP-1 MARK-II (Kyoto Koken Co., Ltd.)]. The determination revealed that the filtrate contained 381 ppm sodium. The same treatment was carried out on the filtered Baylith 5A, and no sodium was detected in the filtrate.

Hereinafter, metal elution test on an inorganic solid acid catalyst was carried out in the same manner.

EXAMPLE 2

To 100 g of the lactic acid oligomer obtained in the same manner as in Example 1 was added 1.8 g of Baylith 5A with which sodium elution (381 ppm) had been observed. Then, the temperature was raised to 200° C., and the pressure was reduced gradually to 20 mmHg over 30 minutes. The mixture was stirred at 195±5° C. for one hour. After the pressure was reduced gradually to 1 mmHg over 30 minutes, the mixture was stirred at 195±5° C. for 10 hours to give lactic acid polymer in the molten state. The product was cooled to room temperature to give 59.10 g of lactic acid polymer as a white solid. The weight-average molecular weight of this polymer was 62,000.

EXAMPLE 3

A 90 wt % aqueous solution of L-lactic acid (50 g) and 50 g of glycolic acid were put into a reaction vessel equipped with a stirrer and a nitrogen-introducing tube. After substitution of nitrogen gas was carried out three times, the mixture was concentrated at 150° C. for 5 hours with stirring in a stream of nitrogen to give 65 g of lactic acid-glycolic acid oligomer. To the obtained oligomer was added 1.3 g of Baylith 5A with which sodium elution (381 ppm) had been observed. Then, the temperature was raised to 210° C., and the pressure was reduced gradually to 20 mmHg over 30 minutes. The mixture was stirred at 210±10° C. for 3 hours. After the pressure was reduced gradually to 1 mmHg over 30 minutes, the mixture was stirred at 210±10° C. for 7 hours to give lactic acid-glycolic acid copolymer in the molten state. The product was cooled to room temperature to give 23.50 g of lactic acid-glycolic acid copolymer as a light brown solid. The weight-average molecular weight of this copolymer was 65,000.

EXAMPLE 4

A 90 wt % aqueous solution of L-lactic acid (90 g) and 10 g of glycolic acid were put into a reaction vessel equipped with a stirrer and a nitrogen-introducing tube. After substitution of nitrogen gas was carried out three times, the mixture was concentrated at 150° C. for 5 hours with stirring in a stream of nitrogen to give 50 g of lactic acid-glycolic acid oligomer. To the obtained oligomer was added 1.1 g of Baylith 5A with which sodium elution (381 ppm) had been observed. Then, the temperature was raised to 200° C., and the pressure was reduced gradually to 20 mmHg over 30 minutes. The mixture was stirred at 195±5° C. for one hour. After the pressure was reduced gradually to 1 mmHg over 30 minutes, the mixture was stirred at 195±5° C. for 7 hours to give lactic acid-glycolic acid copolymer in the molten state. The product was cooled to room temperature to give 29.24 g of lactic acid-glycolic acid copolymer as a white solid. The weight-average molecular weight of this copolymer was 93,000.

EXAMPLE 5

A 90 wt % aqueous solution of L-lactic acid (50 g) and 50 g of hydroxybutyric acid were put into a reaction vessel equipped with a stirrer and a nitrogen-introducing tube. After substitution of nitrogen gas was carried out three times, the mixture was concentrated at 120° C. for 5 hours with stirring in a stream of nitrogen to give 65 g of lactic acid-hydroxybutyric acid oligomer. To the obtained oligomer was added 1.3 g of Baylith 5A with which sodium elution (381 ppm) had been observed. Then, the temperature was raised to 200° C., and the pressure was reduced gradually to 20 mmHg over 30 minutes. The mixture was stirred at 195±5° C. for 3 hours. After the pressure was reduced gradually to 1 mmHg over 30 minutes, the mixture was stirred at 195±5° C. for 7 hours to give lactic acid-hydroxybutyric acid copolymer in the molten state. The product was cooled to room temperature to give 28.15 g of lactic acid-hydroxybutyric acid copolymer as a light brown solid. The weight-average molecular weight of this copolymer was 58,000.

EXAMPLE 6

Glycolic acid (100 g) was put into a reaction vessel equipped with a stirrer and a nitrogen-introducing tube. After substitution of nitrogen gas was carried out three times, glycolic acid was concentrated at 120° C. for 5 hours with stirring in a stream of nitrogen to give 60 g of glycolic acid oligomer. To the obtained oligomer was added 1.2 g of Molecular Sieve 5A (synthetic zeolite: Wako Pure Chemical Industries, Ltd.) with which sodium elution (313 ppm) hadbeen observed. Then, the temperature was raised to 220° C., and the pressure was reduced gradually to 20 mmHg over 30 minutes. The mixture was stirred at 210±10° C. for 3 hours. After the pressure was reduced gradually to 1 mmHg over 30 minutes, the mixture was stirred at 210±10° C. for 7 hours to give glycolic acid polymer in the molten state. The product was cooled to room temperature to give 26.15 g of glycolic acid polymer as a light brown solid. The weight-average molecular weight of this polymer was 63,000.

EXAMPLE 7

To 20.01 g of the lactic acid oligomer obtained in Example 1 was added 0.4 g of synthetic light aluminum silicate (Tomita Pharmaceutical Co., Ltd.) with which sodium elution (490 ppm) had been observed. Then, the temperature was raised to 200° C., and the pressure was reduced gradually to 20 mmHg over 30 minutes. The mixture was stirred at 200±10° C. for one hour. After the pressure was reduced gradually to 1 mmHg over 30 minutes, the mixture was stirred at 200±10° C. for 9 hours to give lactic acid polymer in the molten state. The product was cooled to room temperature to give 10.24 g of lactic acid polymer as a light brown solid. The weight-average molecular weight of this polymer was 63,000.

Comparative Example 1

The same procedure as in Example 7 was repeated except that 0.4 g of synthetic light aluminum silicate (Kyowa Chemical Industry Co., Ltd.) with which no sodium elution had been observed was used instead of 0.4 g of synthetic light aluminum silicate (Tomita Pharmaceutical Co., Ltd.) with which sodium elution (490 ppm) had been observed, whereby 10.24 g of lactic acid polymer was obtained as a light brown solid. The weight-average molecular weight of this polymer was 23,000.

EXAMPLE 8

To 20.21 g of the lactic acid oligomer obtained in Example 1 were added 0. 4 g of synthetic light aluminum silicate (Kyowa Chemical Industry Co., Ltd.) with which no sodium elution had been observed and 0.0541 g of a 90 wt % aqueous solution of sodium lactate (sodium content: 500 ppm). Then, the temperature was raised to 200° C., and the pressure was reduced gradually to 20 mmHg over 30 minutes. The mixture was stirred at 200±10° C. for one hour. After the pressure was reduced gradually to 1 mnmHg over 30 minutes, the mixture was stirred at 200±10° C. for 9 hours to give lactic acid polymer in the molten state. The product was cooled to room temperature to give 9.33 g of lactic acid polymer as a light brown solid. The weight-average molecular weight of this polymer was 51,000.

EXAMPLE 9

To 20.02 g of the lactic acid oligomer obtained in Example 1 were added 0.4 g of aluminum silicate N633L (Nikki Chemical Co., Ltd.) with which no sodium elution had been observed and 0.1055 g of magnesium lactate trihydrate (magnesium content: 500 ppm). Then, the temperature was raised to 200° C., and the pressure was reduced gradually to 20 mmHg over 30 minutes. The mixture was stirred at 200±10° C. for one hour. After the pressure was reduced gradually to 1 mmHg over 30 minutes, the mixture was stirred at 200±10° C. for 9 hours to give lactic acid polymer in the molten state. The product was cooled to room temperature to give 10.24 g of lactic acid polymer as a light brown solid. The weight-average molecular weight of this polymer was 93,000.

EXAMPLE 10

To 20.02 g of the lactic acid oligomer obtained in Example 1 were added 0.4 g of synthetic light aluminum silicate [synthetic light aluminum silicate (Tomita Pharmaceutical Co., Ltd.) with which no sodium had been eluted by the same sodium elution treatment as in the treatment of Baylith 5A (synthetic zeolite) in Example 1] and 0.1055 g of magnesium lactate trihydrate (magnesium content: 500 ppm). Then, the temperature was raised to 200° C., and the pressure was reduced gradually to 20 mmHg over 30 minutes. The mixture was stirred at 200±10° C. for one hour. After the pressure was reduced gradually to 1 mmHg over 30 minutes, the mixture was stirred at 200±10° C. for 9 hours to give lactic acid polymer in the molten state. The product was cooled to room temperature to give 11.46 g of lactic acid polymer as a light brown solid. The weight-average molecular weight of this polymer was 99,000.

Comparative Example 2

The same procedure as in Example 10 was repeated except that 0.4 g of synthetic light aluminum silicate with which no sodium had been eluted alone was used instead of 0.4 g of synthetic light aluminum silicate with which no sodium elution had been observed and 0.1055 g of magnesium lactate trihydrate (magnesium content: 500 ppm), whereby 11.46 g of lactic acid polymer was obtained as a light brown solid. The weight-average molecular weight of this polymer was 11,000.

EXAMPLE 11

To 20.02 g of the lactic acid oligomer obtained in Example 1 were added 0.4 g of the same synthetic light aluminum silicate as used in Example 10 with which no sodium had been eluted and 0.0541 g of a 90 wt % aqueous solution of sodium lactate (sodium content: 500 ppm). Then, the temperature was raised to 200° C., and the pressure was reduced gradually to 20 mmHg over 30 minutes. The mixture was stirred at 200±10° C. for one hour. After the pressure was reduced gradually to 1 mmHg over 30 minutes, the mixture was stirred at 200±10° C. for 9 hours to give lactic acid polymer in the molten state. The product was cooled to room temperature to give 11.46 g of lactic acid polymer as a light brown solid. The weight-average molecular weight of this polymer was 59,000.

EXAMPLE 12

The same procedure as in Example 7 was repeated except that the reaction time under reduced pressure (1 mmHg) was changed from 9 to 29 hours, whereby 8.47 g of lactic acid polymer was obtained as a light brown solid. The weight-average molecular weight of this polymer was 153,000.

The obtained lactic acid polymer passed "Heavy Metal Elution Test" which was carried out according to the general standard test on synthetic resin utensils, containers and packages (Food Hygiene Law, a book of the Six Major Laws, p. 822–853). The result of the potassium permanganate consumption test according to the same general standard test was less than 1 ppm.

The tensile strength and the elongation percentage of a film of the polymer were measured[*2], and the results were 410 kg/cm$^2$ and 10%, respectively.

EXAMPLE 13

The same procedures in Example 7 was repeated except that 0.4 g of synthetic light aluminum silicate (Kyowa Chemical Industry Co., Ltd.) with which no sodium elution had been observed and 0.035 g of sodium acetate (sodium content: 500 ppm) were used instead of 0.4 g of synthetic light aluminum silicate (Tomita Pharmaceutical Co., Ltd.) with which sodium elution (490 ppm) had been observed, whereby 9.33 g of lactic acid polymer was obtained as a dark brown solid. The weight-average molecular weight of this polymer was 54,000.

EXAMPLE 14

The same procedure as in Example 7 was repeated except that 20.21 g of the lactic acid oligomer obtained in Example 1 and 0.4 g of magnesium silicate (Wako Pure Chemical Industries, Ltd.) with which magnesium elution (432 ppm) had been observed were used respectively instead of 20.01 g of the lactic acid oligomer obtained in Example 1 and 0.4 g of synthetic light aluminum silicate (Tomita Pharmaceutical Co., Ltd.) with which sodium elution (490 ppm) had been observed, whereby 9.33 g of lactic acid polymer was obtained as a dark brown solid. The weight-average molecular weight of this polymer was 54,000.

Comparative Example 3

The same procedure as in Example 1 was repeated except that 0.0541 g of a 90 wt % aqueous solution of sodium lactate (sodium content: 500 ppm) was used instead of Baylith 5A with which sodium elution (381 ppm) had been observed, whereby 1.33 g of lactic acid polymer was obtained as a dark brown solid. The weight-average molecular weight of this polymer was 4,000.

EXAMPLE 15

A 90% aqueous solution of L-lactic acid (150 g) was put into a reaction vessel equipped with a stirrer and a nitrogen-introducing tube. After substitution of nitrogen gas was carried out three times, the solution was concentrated at 120° C. for 5 hours with stirring in a stream of nitrogen. To the resulting concentrate was added 2.1 g of commercially available synthetic aluminum silicate containing 17% aluminum oxide. Then, the temperature was raised to 220° C., and the pressure was reduced gradually to 20 mmHg over 30 minutes. The mixture was stirred at 220±5° C. for 30 hours, and the reaction product obtained in the molten state was cooled to room temperature to give 69.2 g of lactic acid polymer as a light brown solid.

The physical properties of this lactic acid polymer are as follows.

(1) Weight-average molecular weight*[4]: 98,000

(2) Tensile strength: 280 kg/cm$^2$ (3) Elongation percentage: 5%

*[4] The lactic acid polymer was dissolved in chloroform to obtain a 0.5% solution, and the weight-average molecular weight was measured by gel permeation chromatography (GPC) using standard polystyrene of known molecular weight. As GPC columns, TOSOH G-5000, TOSOH G-3000, and TOSOH G-1000 (TOSOH CORPORATION) connected in series were used, and the measurement was carried out at a temperature of 40° C. (Hereinafter the measurement is carried out in the same manner.)

The lactic acid polymer was placed in a platinum petri dish and was subjected to sodium carbonate melting treatment. The aluminum content and the silicon content of the polymer were determined to be 0.248% and 1.075%, respectively, by using an atomic absorption spectrometer (Z-8270, product of Hitachi, Ltd.).

From these values the aluminum silicate content was calculated to be 2.77%.

The lactic acid polymer passed "Heavy Metal Dissolution Test" which was carried out according to the general standard test on synthetic resin utensils, containers and packages (Food Hygiene Law, a book of the Six Major Laws, P. 822–853). The result of the potassium permanganate consumption test according to the same general standard test was less than 1 ppm.

No. 2 test pieces of the lactic acid polymer (thickness of the film: 100 $\mu$) were buried in the ground, and taken out after 3 months for observation. The test pieces had no trace of the original form.

EXAMPLE 16

A 90% aqueous solution of L-lactic acid (150 g) was put in a reaction vessel equipped with a stirrer and a nitrogen-introducing tube. After substitution of nitrogen gas was carried out three times, the solution was concentrated at 120° C. for 5 hours with stirring in a stream of nitrogen. To the resulting concentrate was added 1.8 g of commercially available synthetic aluminum silicate containing 17% aluminum oxide which had been dried at 200° C. for 8 hours. Then, the temperature was raised to 220° C., and the pressure was reduced gradually to 1 mmHg over 30 minutes. The mixture was stirred at 220±5° C. for 35 hours, and the reaction product obtained in the molten state was cooled to room temperature to give 62.2 g of lactic acid polymer as a light brown solid.

The physical properties of this lactic acid polymer are as follows.

(1) Weight-average molecular weight: 102,000

(2) Tensile strength: 295 kg/cm$^2$ (3) Elongation percentage: 8%

EXAMPLE 17

The same procedure as in Example 15 was repeated except that the amount of synthetic aluminum silicate was changed to 3.8 g, whereby 60.2 g of lactic acid polymer was obtained as a light brown solid.

The physical properties of this lactic acid polymer are as follows.

(1) Weight-average molecular weight: 65,000

(2) Tensile strength: 140 kg/cm$^2$ (3) Elongation percentage: 4%

EXAMPLE 18

A 90% aqueous solution of L-lactic acid (150 g) was put in a reaction vessel equipped with a stirrer and a nitrogen-introducing tube. After substitution of nitrogen gas was carried out three times, the solution was concentrated at 120° C. for 5 hours with stirring in a stream of nitrogen. To the resulting concentrate was added 3.8 g of commercially available synthetic aluminum silicate containing 22% aluminum oxide which had been dried at 200° C. for 8 hours. Then the temperature was raised to 220° C., and the pressure was reduced gradually to 1 mmHg over 30 minutes. The mixture was stirred at 220±5° C. for 30 hours, and the reaction product obtained in the molten state was cooled to room temperature to give 63.2 g of lactic acid polymer as a light brown solid.

The physical properties of this lactic acid polymer are as follows.

(1) Weight-average molecular weight: 73,000

(2) Tensile strength: 220 kg/cm$^2$ (3) Elongation percentage: 3%

EXAMPLE 19

The same procedure as in Example 15 was repeated except that 3.8 g of commercially available synthetic aluminum silicate containing 14% aluminum oxide was used as aluminum silicate, whereby 60.2 g of lactic acid polymer was obtained as a light brown solid.

The physical properties of this lactic acid polymer are as follows.

(1) Weight-average molecular weight: 70,000

(2) Tensile strength: 110 kg/cm$^2$ (3) Elongation percentage: 3%

EXAMPLE 20

A 90% aqueous solution of L-lactic acid (450 g) was put in a reaction vessel equipped with a stirrer and a nitrogen-introducing tube. After substitution of nitrogen gas was carried out three times, the solution was concentrated at 120° C. for 5 hours with stirring in a stream of nitrogen to give 300 g of lactic acid oligomer. To 100 g of this lactic acid oligomer was added 2.1 g of commercially available synthetic aluminum silicate containing 17% aluminum oxide. Then the temperature was raised to 200° C., and the pressure was reduced gradually to 20 mmHg over 30 minutes. The mixture was stirred at 200±5° C. for 30 hours, and the reaction product obtained in the molten state was cooled to room temperature to give 59.2 g of lactic acid polymer as a light brown solid.

The physical properties of this lactic acid polymer are as follows.

(1) Weight-average molecular weight: 70,000

(2) Tensile strength: 110 kg/cm$^2$ (3) Elongation percentage: 3%

EXAMPLE 21

To 100 g of the lactic acid oligomer obtained in Example 20 was added 2.1 g of commercially available synthetic aluminum silicate containing 22% aluminum oxide. Then the temperature was raised to 200° C., and the pressure was reduced gradually to 20 mmHg over 30 minutes. The mixture was stirred at 200±5° C. for 30 hours and the reaction product obtained in the molten state was cooled to room temperature to give 61.2 g of lactic acid polymer as a light brown solid.

The physical properties of this lactic acid polymer are as follows.

(1) Weight-average molecular weight: 70,000
(2) Tensile strength: 110 kg/cm$^2$
(3) Elongation percentage: 3%

EXAMPLE 22

The lactic acid oligomer obtained in Example 20 (18.0 g) and 2.1 g of 100% glycolic acid were put in a reaction vessel equipped with a stirrer and a nitrogen-introducing tube. After substitution of nitrogen gas was carried out three times, the materials were molten by raising the temperature by 10° C. perminute up to 120° C. in a stream of nitrogen, followed by addition of 2.1 g of commercially available synthetic aluminum silicate containing 17% aluminum oxide. Then the temperature was raised to 200° C., and the pressure was reduced gradually to 20 mmHg over 30 minutes, followed by stirring at 210±10° C. for 3 hours. After the pressure was reduced gradually to 1 mmHg over 30 minutes, the mixture was stirred at 210±10° C. for 19 hours to give copolymer in the molten state. The product was cooled to room temperature to give 9.8 g of lactic acid-glycolic acid copolymer as a dark brown solid.

The weight-average molecular weight of this copolymer was 65,000.

The copolymer was dissolved in heavy dimethylformamide [DCON(CD$_3$)$_2$] and the composition molar ratio thereof was measured with NMR, GSX-400 (product of JOEL Ltd.) using a 5 mm-measurement tube.

The molar ratio of the copolymer composition of lactic acid and glycolic acid was 8.5:1.

EXAMPLE 23

A 90% aqueous solution of L-lactic acid (32.4 g) and 3.75 g of γ-butyrolactone were put in a reaction vessel equipped with a stirrer and a nitrogen-introducing tube. After substitution of nitrogen gas was carried out three times, the temperature was raised by 10° C. per minute to 120° C. in a stream of nitrogen, and the mixture was concentrated at 120° C. for 5 hours with stirring. To the resulting concentrate was added 2.2 g of commercially available synthetic aluminum silicate containing 17% aluminum oxide. Then the temperature was raised to 200° C. and the pressure was reduced gradually to 20 mmHg over 30 minutes, followed by stirring at 220±15° C. for 3 hours. After the pressure was reduced gradually to 1 mmHg over 30 minutes, the mixture was stirred at 210±10° C. for 18 hours to give copolymer in the molten state. The product was cooled to room temperature to give 21.2 g of lactic acid-hydroxybutyric acid copolymer as a dark brown solid. The weight-average molecular weight of this copolymer was 65,000.

EXAMPLE 24

The light brown lactic acid polymer obtained in Example 15 (10 g) was dissolved in 140 g of chloroform and the solution was filtered. The obtained filtrate was added to 500 ml of isopropanol for precipitation to give 6.5 g of white lactic acid polymer.

The physical properties of this lactic acid polymer are as follows.

(1) Weight-average molecular weight: 105,000
(2) Tensile strength: 350 kg/cm$^2$
(3) Elongation percentage: 10%

Determination of the aluminum content and the silicon content of the obtained lactic acid polymer was carried out in the same manner as in Example 15 with an atomic absorption spectrometer, but neither aluminum nor silicon was detected. This shows that the aluminum silicate content of the lactic acid polymer is expected to be less than 0.03%.

The heavy metal dissolution test was carried out on the obtained lactic acid polymer in the same manner as in Example 15, and the result was successful. The potassium permanganate consumption test was also carried out, and the result thereof was less than 1 ppm.

No. 2 test pieces of the lactic acid polymer (thickness of the film: 100 μ) were buried in the ground and taken out after 3 months for observation. The test pieces retained their original form, but the tensile strength was reduced to less than 100 kg/cm$^2$.

EXAMPLE 25

A 90 wt % aqueous solution of L-lactic acid (25 g, 0.25 mol) and 5.38 g of a distillate obtained by polycondensation reaction of lactic acid in the following manner (by-product, main component: lactide)*[5] were put into a reaction vessel equipped with a stirrer, a Dean-Stark trap, and a nitrogen-introducing tube. After substitution of nitrogen gas was carried out three times, the temperature at the outside of the reaction vessel was raised by 10° C. per minute to 150° C., and the mixture was concentrated with stirring for 6 hours in a stream of nitrogen, simultaneously with the removal of the distilled water from the system, to obtain lactic acid oligomer (weight-average molecular weight: 240).

To the obtained oligomer was added 0.4 g of synthetic aluminum silicate with which sodium elution (490 ppm) had been observed (Tomita Pharmaceutical Co., Ltd.). After the temperature was raised to 200° C. and the pressure was reduced gradually to 20 mmHg over 30 minutes, the mixture was stirred at 200±5° C. for 3 hours. Then, the pressure was reduced gradually to 1 mmHg over 30 minutes, and the mixture was stirred at 200±5° C. for 7 hours and then cooled to room temperature to give 14.6 g of lactic acid polymer as a light brown solid.

Weight-average molecular weigh of lactic acid polymer: 65,000

Yield of lactic acid polymer (based on the lactic acid used as a stating material; the same shall apply hereinafter): 81.1%

Tensile strength: 280 kg/cm$^2$

Elongation percentage: 5%

*[5] A 90 wt % aqueous solution of L-lactic acid (500 g) was put into a reaction vessel equipped with a stirrer, a Dean-Stark trap, and a nitrogen-introducing tube. After substitution of nitrogen gas was carried out three times, the temperature at the outside of the reaction vessel was raised by 10° C. per minute to 150° C., and the solution was concentrated with stirring for 6 hours in a stream of nitrogen, simultaneously with the removal of the distilled water from the system, to give 365 g of lactic acid oligomer (weight-average molecular weight: 235).

To 100 g of the obtained lactic acid oligomer was added 2.0 g of synthetic aluminum silicate with which sodium elution (490 ppm) had been observed (Tomita Pharmaceutical Co., Ltd.). After the temperature was raised to 200° C. and the pressure was reduced gradually to 20 mmHg over 30 minutes, the mixture was stirred at 200±5° C. for 3 hours. Then, the pressure was reduced gradually to 1 mmHg over 30 minutes, and the mixture was stirred at 200±5° C. for 7 hours and then cooled to room temperature to give 59.5 g of lactic acid polymer as a light brown solid. Simultaneously, 32.0 g of a white solid was collected as a distillate (by-product).

According to the analysis by gas chromatography, the white solid comprised mainly lactide and also contained a small amount of straight-chain dimers of lactic acid.

The result of the analysis of the white solid by gas chromatography is shown below as well as the conditions of gas chromatography.

Analytical Values by Gas Chromatography
  Lactic acid: 8%
  Lactide: 77%
  Lactic acid straight chain-dimers: 15%
Gas Chromatography Conditions
  Column: CP-Sill8CB (J&W, length: 25 m, inside diameter: 0.25 mm)
  Temperature conditions: injection temperature; 150° C., detector; 330° C., kept at 80° C. for 6 minutes, raised by 5° C./min., and then kept at 300° C. for 15 minutes
  Detector: FID
  Internal standard: Methyl benzoate

EXAMPLE 26

To a mixture of 14.0 g of the lactic acid oligomer obtained according to the method of note 1 ($*^5$) of Example 25 (corresponding to 0.192 mol of lactic acid) and 4.48 g of the distillate obtained by the polycondensation reaction of lactic acid (by-product, main component: lactide) was added 0.4 g of synthetic aluminum silicate with which sodium elution (490 ppm) had been observed (Tomita Pharmaceutical Co., Ltd.). After the temperature was raised to 200° C. and the pressure was reduced gradually to 20 mmHg over 30 minutes, the mixture was stirred at 200±5° C. for 3 hours. Then, the pressure was reduced gradually to 1 mmHg over 30 minutes, and the mixture was stirred at 200±5° C. for 7 hours and then cooled to room temperature to give 11.7 g of lactic acid polymer as a light brown solid.

Weight-average molecular weight of lactic acid polymer: 75,000

Yield of lactic acid polymer: 84.6%

EXAMPLE 27

To a mixture of 14.0 g of the lactic acid oligomer obtained according to the method of note 1 ($*^5$) of Example 25 (corresponding to 0.192 mol of lactic acid) and 4 g of lactide (corresponding to 0.056 mol of lactic acid) was added 0.4 g of synthetic aluminum silicate with which sodium elution (490 ppm) had been observed (Tomita Pharmaceutical Co., Ltd.). After the temperature was raised to 200° C. and the pressure was reduced gradually to 20 mmHg over 30 minutes, the mixture was stirred at 200±5° C. for 3 hours. Then, the pressure was reduced gradually to 1 mmHg over 30 minutes, and the mixture was stirred at 200±5° C. for 7 hours and then cooled to room temperature to give 12.1 g of lactic acid polymer as a light brown solid.

Weight-average molecular weight of lactic acid polymer: 74,000

Yield of lactic acid polymer: 87.5%

EXAMPLE 28

A 90 wt % aqueous solution of L-lactic acid (1,500 g) was put into a titanium reaction vessel equipped with a stirrer and a nitrogen-introducing tube. This reaction vessel has a volume of 3 L and is equipped with a double helical ribbon impeller, and a partial condenser having a stage efficiency of about 0.5.

After substitution of nitrogen gas was carried out three times, the solution was concentrated with stirring at 150° C. for 5 hours in a stream of nitrogen. To the resulting solution was added 30.0 g of synthetic aluminum silicate with which sodium elution (490 ppm) had been observed (Tomita Pharmaceutical Co., Ltd.). After the temperature was raised gradually to 200° C. over 2 hours and the pressure was reduced gradually to 1 mmHg, the mixture was stirred at 200±5° C. for 20 hours. At this point, the molecular weight of the mixture was 29,000. Then, the pressure was restored to ordinary pressure with nitrogen gas, and 360 g of lactide was added to the mixture. The pressure was again reduced gradually to 15 mmHg, and the mixture was subjected to reaction at 200±5° C. for 12 hours. After the pressure was further reduced to 1 mmHg, the lactide was removed at 200° C. over 3 hours. The resulting mixture was cooled to room temperature to give 778 g of lactic acid polymer as a light brown solid.

Weight-average molecular weight of lactic acid polymer: 83,000

Yield of lactic acid polymer: 72.0%

Industrial Applicability

The present invention provides polyhydroxycarboxylic acids having a weight-average molecular weight of 50,000 or above which are useful as biodegradable plastics for food-wrapping films, beverage bottles, drug delivery systems, etc.

We claim:

1. A process for producing a polyhydroxycarboxylic acid, which comprises polycondensing a hydroxycarboxylic acid or an oligomer thereof in the presence of an inorganic solid acid catalyst in combination with an alkali metal compound catalyst or an alkaline earth metal compound catalyst.

2. A process according to claim 1, wherein the inorganic solid acid catalyst is a catalyst which is mainly composed of silica or alumina.

3. A process according to claim 1, wherein the inorganic solid acid catalyst is aluminum silicate, silica gel, zeolite, aluminum oxide, magnesium silicate, activated clay, acid clay, aluminum borate, bentonite, kaolin, talc, or silicate.

4. A process according to claim 1, wherein the alkali metal or the alkaline earth metal in the alkali metal compound catalyst or the alkaline earth metal compound catalyst is eluted in a reaction mixture.

5. A process according to claim 1, wherein the polyhydroxycarboxylic acid has a weight-average molecular weight of 50,000 or above.

6. A process according to claim 1, wherein the polyhydroxycarboxylic acid is a polyhydroxycarboxylic acid having a weight-average molecular weight of 50,000 or above and carrying 0.03–10 wt % of an inorganic solid acid catalyst.

7. A process according to claim 5 wherein the weight-average molecular weight is 50,000–300,000.

8. A process according to claim 1, wherein the polycondensation is carried out in the presence of an a Lactide.

9. A process according to claim 8, wherein the inorganic solid acid catalyst is a catalyst which is mainly composed of silica or alumina.

10. A process according to claim 8, wherein the inorganic solid acid catalyst is aluminum silicate, silica gel, zeolite, aluminum oxide, magnesium silicate, activated clay, acid clay, aluminum borate, bentonite, kaolin, talc, or silicate.

11. A process according to claim 8, wherein the alkali metal or the alkaline earth metal in the alkali metal compound catalyst or the alkaline earth metal compound catalyst is eluted in the reaction mixture.

12. A process according to claim 8, wherein the weight-average molecular weight of the polyhydroxycarboxylic acid is 50,000 or above.

13. A process according to claim 8, wherein the polyhydroxycarboxylic acid is a polyhydroxycarboxylic acid having a weight-average molecular weight of 50,000 or above and carrying 0.03–10 wt % of an inorganic solid acid catalyst.

14. A process according to claim 12, wherein the weight-average molecular weight is 50,000–300,000.

15. A process according to claim 6, wherein the weight-average molecular weight is 50,000–300,000.

16. A process according to claim 13, wherein the weight-average molecular weight is 50,000–300,000.

17. A process according to claim 1, wherein the polyhydroxycarboxylic acid produced by said process includes from 0.03 to 10 wt % of an inorganic solid acid catalyst and said polyhydroxycarboxylic acid is biodegradable.

18. A process according to claim 1, wherein said hydroxycarboxylic acid or an oligomer thereof is polycondensed in the presence of an inorganic solid acid catalyst in combination with an alkali metal compound catalyst.

19. A process according to claim 1, wherein said hydroxycarboxylic acid or an oligomer thereof is polycondensed in the presence of an inorganic solid acid catalyst in combination with an alkaline earth metal compound catalyst.

20. A process according to any one of claims 2–6, 8–13 and 17–18 wherein the polycondensation is carried out without using an organic solvent.

21. A process for producing a polyhydroxycarboxylic acid, which comprises polycondensing a hydroxycarboxylic acid or an oligomer thereof in the presence of an inorganic solid acid catalyst in combination with an alkali metal compound catalyst or an alkaline earth metal compound catalyst, and wherein the polycondensation is carried out without using an organic solvent.

22. A process for producing a biodegradable polyhydroxycarboxylic acid which includes from 0.03 to 10 wt % of an inorganic solid acid catalyst, which comprises polycondensing a hydroxycarboxylic acid or an oligomer thereof in the presence of an inorganic solid acid catalyst in combination with an alkali metal compound catalyst or an alkaline earth metal compound catalyst, and wherein the polycondensation is carried out without using an organic solvent.

* * * * *